US009608260B2

(12) United States Patent
Oh et al.

(10) Patent No.: US 9,608,260 B2
(45) Date of Patent: Mar. 28, 2017

(54) ANODE ACTIVE MATERIAL HAVING HIGH DENSITY AND PREPARATION METHOD THEREOF

(71) Applicant: LG Chem, Ltd., Seoul (KR)

(72) Inventors: Byung Hun Oh, Daejeon (KR); Je Young Kim, Daejeon (KR); Hyun Woong Yun, Daejeon (KR); Ye Ri Kim, Daejeon (KR)

(73) Assignee: LG Chem, Ltd. (KR)

( * ) Notice: Subject to any disclaimer, the term of this patent is extended or adjusted under 35 U.S.C. 154(b) by 662 days.

(21) Appl. No.: 14/012,347

(22) Filed: Aug. 28, 2013

(65) Prior Publication Data

US 2014/0017567 A1 Jan. 16, 2014

Related U.S. Application Data

(63) Continuation of application No. PCT/KR2013/006216, filed on Jul. 11, 2013.

(30) Foreign Application Priority Data

Jul. 13, 2012 (KR) .................. 10-2012-0076905
Jun. 11, 2013 (KR) .................. 10-2013-0066228

(51) Int. Cl.
*H01M 4/131* (2010.01)
*H01M 4/485* (2010.01)
(Continued)

(52) U.S. Cl.
CPC ............ *H01M 4/131* (2013.01); *C01D 15/02* (2013.01); *C01G 1/02* (2013.01); *C01G 23/005* (2013.01);
(Continued)

(58) Field of Classification Search
None
See application file for complete search history.

(56) References Cited

U.S. PATENT DOCUMENTS

2003/0054248 A1 3/2003 Noda et al.
2005/0015846 A1 1/2005 Vistins et al.
(Continued)

FOREIGN PATENT DOCUMENTS

CN  1360739 A   7/2002
CN  101093887 A  12/2007
(Continued)

OTHER PUBLICATIONS

Machine Translation of Osada et al. (JP 2013-065467 A).*
(Continued)

*Primary Examiner* — Patrick Ryan
*Assistant Examiner* — Haixia Zhang
(74) *Attorney, Agent, or Firm* — Lerner, David, Littenberg, Krumholz & Mentlik, LLP

(57) ABSTRACT

Provided is an anode active material including lithium metal oxide particles having an internal porosity ranging from 3% to 8% and an average particle diameter ($D_{50}$) ranging from 5 μm to 12 μm. According to the present invention, since the high-density lithium metal oxide particles are included, the adhesion to an anode may be significantly improved even by using the same or smaller amount of a binder that is required during the preparation of an anode slurry, and high rate characteristics of a secondary battery may be improved by decreasing the average particle diameter of the lithium metal oxide particles.

7 Claims, 1 Drawing Sheet

(51) Int. Cl.
*C01G 23/00* (2006.01)
*C01G 1/02* (2006.01)
*H01M 4/04* (2006.01)
*C01D 15/02* (2006.01)
H01M 10/0525 (2010.01)
H01M 4/02 (2006.01)
H01M 10/052 (2010.01)

(52) U.S. Cl.
CPC ....... *H01M 4/0416* (2013.01); *H01M 4/0419* (2013.01); *H01M 4/485* (2013.01); *C01P 2004/03* (2013.01); *C01P 2004/61* (2013.01); *C01P 2006/12* (2013.01); *C01P 2006/14* (2013.01); *H01M 10/052* (2013.01); *H01M 10/0525* (2013.01); *H01M 2004/021* (2013.01); *Y02E 60/122* (2013.01); *Y02P 70/54* (2015.11)

(56) References Cited

U.S. PATENT DOCUMENTS

| | | |
|---|---|---|
| 2005/0158546 A1 | 7/2005 | Shizuka |
| 2006/0263693 A1 | 11/2006 | Kim et al. |
| 2010/0178556 A1 | 7/2010 | Manev et al. |
| 2011/0127463 A1 | 6/2011 | Yuasa et al. |
| 2011/0195308 A1 * | 8/2011 | Lee ................ H01M 4/131 429/213 |
| 2012/0021292 A1 | 1/2012 | Awano et al. |
| 2012/0045693 A1 | 2/2012 | Eom |
| 2012/0070744 A1 | 3/2012 | Moriyama et al. |
| 2013/0108925 A1 | 5/2013 | Holzapfel |

FOREIGN PATENT DOCUMENTS

| | | | |
|---|---|---|---|
| CN | 102148375 A | | 8/2011 |
| CN | 102376945 A | | 3/2012 |
| CN | 102428031 A | | 4/2012 |
| EP | 1057783 A2 | | 12/2000 |
| EP | 1624509 A1 | | 2/2006 |
| EP | 2355225 A1 | | 8/2011 |
| JP | EP1057783 A2 | * | 12/2000 ........... C01G 23/005 |
| JP | 2003-229124 A | | 8/2003 |
| JP | 2011-049180 A | | 3/2011 |
| JP | 2012-043765 A | | 3/2012 |
| JP | 2012-113950 A | | 6/2012 |
| JP | 2013065467 A | * | 4/2013 |
| TW | 201133994 A | | 10/2011 |

OTHER PUBLICATIONS

International Search Report from PCT/KR2013/006216 dated Oct. 8, 2013.

Hun-Gi Jung et al., "Microscale spherical carbon-coated Li4Ti5O12 as ultra high power anode material for lithium batteries," Energy & Environmental Science, 2011, 4., 1345-51.

* cited by examiner

ANODE ACTIVE MATERIAL HAVING HIGH DENSITY AND PREPARATION METHOD THEREOF

CROSS REFERENCE TO RELATED APPLICATIONS

The present application is a continuation of International Application No. PCT/KR2013/006216 filed Jul. 11, 2013, which claims the benefit of the filing dates of Korean Patent Application Nos. 10-2013-0066228 filed Jun. 11, 2013, and 10-2012-0076905, filed on Jul. 13, 2012, the disclosures of which are hereby incorporated herein by reference.

TECHNICAL FIELD

The present invention relates to an anode active material including high-density lithium metal oxide particles, a lithium secondary battery including the same, and a method of preparing the anode active material.

BACKGROUND ART

The prices of energy sources have increased due to the depletion of fossil fuels, the interest in environmental pollution has been amplified, and the demand for eco-friendly alternative energy sources has become an indispensable factor for the future life. Thus, research into various power generation techniques, such as nuclear power, solar power, wind power, and tidal power, has continuously conducted, and great interests in power storage devices for more effectively using the energy thus generated have also grown.

In particular, with respect to lithium secondary batteries, the demand as an energy source has rapidly increased as the technological development and demand for mobile devices have increased, the use thereof as power sources of electric vehicles (EVs) or hybrid electric vehicles (HEVs) has recently been realized, and the application area has been extended to include uses, such as an auxiliary power source through power grids and the like.

A carbon-based compound that allows reversible intercalation and deintercalation of lithium ions as well as structural and electrical properties being maintained has mainly been used as an anode active material for an anode of a typical lithium secondary battery. However, a significant amount of research into lithium titanium oxides has recently been conducted.

Since lithium titanium oxides are a zero-strain material in which structural changes are extremely low during charging and discharging, lifetime characteristics are relatively excellent, a relatively high voltage range is obtained, and dendrites do not occur. Thus, lithium titanium oxides are known as a material having excellent safety and stability.

However, with respect to the lithium titanium oxides, since electrical conductivities thereof may be lower than those of carbon materials, such as graphite, and atomization may be required to improve charge rates, there may be a limitation that a content of a binder may increase to form an electrode.

DISCLOSURE OF THE INVENTION

Technical Problem

The present invention provides an anode active material including lithium metal oxide particles having specific internal porosity and average particle diameter. Furthermore, a secondary battery including the anode active material is provided.

The present invention also provides a method of preparing the lithium metal oxide particles.

The object of the present invention is not limited to the aforesaid, but other objects not described herein will be clearly understood by those skilled in the art from descriptions below.

Technical Solution

According to an aspect of the present invention, there is provided an anode active material including lithium metal oxide particles, wherein an internal porosity of the lithium metal oxide particles is in a range of 3% to 8% and an average particle diameter ($D_{50}$) thereof is in a range of 5 μm to 12 μm.

According to another aspect of the present invention, there is provided a method of preparing lithium metal oxide particles having an internal porosity ranging from 3% to 8% and an average particle diameter ($D_{50}$) ranging from 5 μm to 12 μm, including preparing a precursor solution by adding a lithium salt and a metal oxide to a volatile solvent and stirring; providing the precursor solution into a chamber of a spray dryer; and spraying the precursor solution in the chamber and drying.

Also, according to another aspect of the present invention, there is provided an anode including the anode active material.

Furthermore, according to another aspect of the present invention, there is provided a secondary battery including the anode.

Advantageous Effects

As described above, an anode active material according to the technical idea of the present invention includes high-density lithium metal oxide particles, and thus, the adhesion to an anode may be significantly improved. That is, an amount of a binder required to obtain the same strength of adhesion to the electrode may be significantly reduced in comparison to a typical anode active material having a typical density.

High-density lithium metal oxide particles may be formed as the internal porosity of the lithium metal oxide particles decreases. As a result, the amount of the binder required to prepare an anode slurry may be reduced, and thus, it is advantageous for the mass production of secondary batteries.

Since the realization of the high-density lithium metal oxide and the resultant good adhesion to the electrode may be possible, an average particle diameter of the lithium metal oxide particles may be further decreased. As a result, high rate characteristics of the secondary battery may be improved.

The high-density anode active material may be formed by a specific preparation method according to an embodiment of the present invention.

MODE FOR CARRYING OUT THE INVENTION

Figure 1:
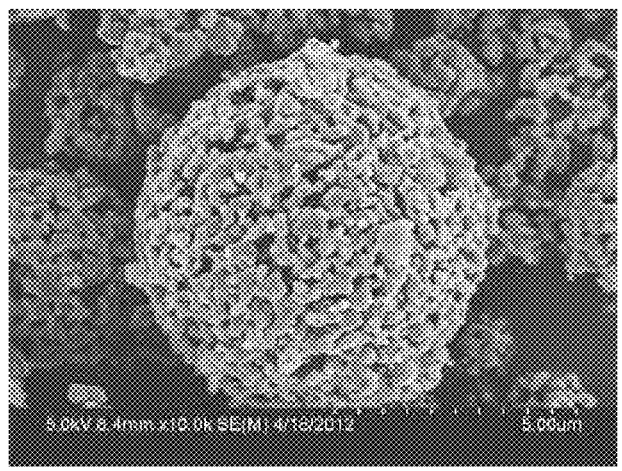
FIG. 1 is a scanning electron microscope (SEM) micrograph of $Li_4Ti_5O_{12}$ of Comparative Example 3.

Preferred embodiments of the present invention will be described in more detail with reference to the accompanying drawings. However, the following embodiments are merely presented to exemplify the present invention, and the scope of the present invention is not limited thereto.

An anode active material according to an embodiment of the present invention includes lithium metal oxide particles, wherein an internal porosity of the lithium metal oxide particles is in a range of 3% to 8% and an average particle diameter ($D_{50}$) thereof is in a range of 5 μm to 12 μm.

According to an embodiment of the present invention, since high-density lithium metal oxide particles having the specific internal porosity and the average particle diameter ($D_{50}$) are included, the adhesion to an anode may be significantly improved even by using the same or smaller amount of a binder that is required during the preparation of an anode slurry. Also, high rate characteristics of a secondary battery may be improved by further decreasing the average particle diameter of the lithium metal oxide particles.

The lithium metal oxide particle according to an embodiment of the present invention, as a secondary particle in which two or more primary particles are agglomerated, may be a porous particulate.

In the case that the lithium metal oxide particles, as the primary particles, are used in the anode active material of the lithium secondary battery, the adhesion to the electrode may not be problematic, but high rate characteristics may degrade. In order to address the above limitation, a diameter of the primary particle may be decreased to 300 nm or less. However, in this case, limitations in a process of preparing the anode slurry, for example, an increase in product costs due to the use of a large amount of the binder or a decrease in electrical conductivity, may occur due to the increase in a specific surface area. Therefore, in order to address the limitations caused by using the primary particles, the lithium metal oxide particle according to the embodiment of the present invention may be in the form of a secondary particle, in which two or more primary particles are agglomerated.

Typically, since the secondary particle may have a porous shape, a large amount of the binder is required in order to maintain electrode adhesion. As a result, the capacity of the battery may be decreased due to the use of the large amount of the binder.

However, since the lithium metal oxide particles according to the embodiment of the present invention are high-density secondary particles having an internal porosity ranging from 3% to 8%, sufficient electrode adhesion may not only be obtained but excellent high rate characteristics may also be obtained, even in the case in which a small amount of the binder is used in comparison to typical secondary particles, for example, the binder is used in an amount ranging from 20% to 50% of a typical amount of the binder used.

In the case that the internal porosity of the lithium metal oxide particles is less than 3%, practical difficulties in terms of a preparation process may occur in consideration of the fact that the secondary particles are formed by the agglomeration of the primary particles. In the case in which the internal porosity of the lithium metal oxide particles is greater than 8%, the amount of the binder required to maintain appropriate electrode adhesion may increase, and thus, the conductivity may be reduced and the capacity may be decreased. Therefore, the effect of the present invention aimed at using a small amount of the binder may be insignificant.

According to an embodiment of the present invention, the internal porosity of the lithium metal oxide particles may be defined below:

Internal porosity=volume of pores per unit mass/
(specific volume+volume of pores per unit
mass)

The measurement of the internal porosity is not particularly limited. For example, according to an embodiment of the present invention, the internal porosity may be measured by using absorption gas, such as nitrogen, and BELSORP (Brunauer-Emmett-Teller (BET) instrument) by BEL Japan, Inc.

Similarly, a specific surface area (BET) of the lithium metal oxide particles may be in a range of 2 $m^2$/g to 8 $m^2$/g.

According to an embodiment of the present invention, the specific surface area of the lithium metal oxide particles may be measured by a BET method. For example, the specific surface area may be measured by a 6-point BET method according to a nitrogen gas adsorption-flow method using a porosimetry analyzer (Belsorp-II mini by Bell Japan Inc.).

The average particle diameter ($D_{50}$) of the lithium metal oxide particles may be in a range of 5 μm to 12 μm, and an average particle diameter of the primary particles constituting the lithium metal oxide particles may be in a range of 100 nm to 400 nm.

In the present invention, the average particle diameter ($D_{50}$) of the lithium metal oxide particles may be defined as a particle diameter at 50% in a cumulative particle diameter distribution. The average particle diameter ($D_{50}$) of the lithium metal oxide particles according to the embodiment of the present invention, for example, may be measured by using a laser diffraction method. The laser diffraction method may generally measure a particle diameter ranging from a submicron level to a few mm, and may obtain highly repeatable and high resolution results.

Typically, since the lithium metal oxide particles have low conductivity, it is advantageous to have a small average particle diameter in order to be applied to a cell for fast charging. However, in this case, a large amount of the binder is required in order to maintain appropriate electrode adhesion due to the increase in the specific surface area as described above. That is, in the case that the average particle diameter of the lithium metal oxide particles is less than 5 μm, the amount of the binder required to maintain desired electrode adhesion may increase due to the increase in the specific surface area of the anode active material, and as a result, the reduction of the conductivity of the electrode may occur. In the case in which the average particle diameter of the lithium metal oxide particles is greater than 12 μm, fast charging characteristics may degrade. Therefore, with respect to lithium metal oxide particles having an average particle diameter ranging from 5 μm to 12 μm, as the high-density lithium metal oxide particles according to the embodiment of the present invention, the amount of the binder required to maintain electrode adhesion may not only be decreased, but fast charging characteristics may also be improved by increasing an area, in which a direct reaction with lithium (Li) ions may be possible.

In the case that the average particle diameter of the primary particles is less than 100 nm, the electrode adhesion may decrease due to the increase in the porosity of the lithium metal oxide particles formed by the agglomeration of the primary particles. In the case in which the average particle diameter of the primary particles is greater than 400 nm, the formability of the lithium metal oxide particles may decrease and granulation may be difficult to be controlled.

The lithium metal oxide according to an embodiment of the present invention is a material that may store and release lithium ions, in which the lithium metal oxide may be expressed by a compositional formula of $Li_xM_yO_z$ (where M is at least one element independently selected from the group consisting of titanium (Ti), tin (Sn), copper (Cu), lead (Pb), antimony (Sb), zinc (Zn), iron (Fe), indium (In), aluminum (Al), or zirconium (Zr), and x, y, and z are determined according to the oxidation number of M).

According to an embodiment of the present invention, the lithium metal oxide may be lithium titanium oxide, which is any one selected from the group consisting of $Li_4Ti_5O_{12}$, $LiTi_2O_4$, $Li_2TiO_3$, and $Li_2Ti_3O_7$, or a mixture of two or more thereof, in view of charge and discharge characteristics and lifetime characteristics required as an anode active material of the secondary battery.

The lithium metal oxide according to the embodiment of the present invention may be included in an amount ranging from 50 wt % to 100 wt % based on a total weight of the anode active material. The case that the amount of the lithium metal oxide is 100 wt % based on the total weight of the anode active material means a case in which the anode active material is composed of only the lithium metal oxide.

In a secondary battery according to an embodiment of the present invention, the anode active material may further include at least one active material selected from the group consisting of carbon-based materials that are typically used in an anode active material, transition metal oxides, silicon (Si)-based materials and Sn-based materials, in addition to the lithium metal oxide. However, a type of the anode active material is not limited thereto.

Also, the present invention provides a method of preparing lithium metal oxide particles having an internal porosity ranging from 3% to 8% and an average particle diameter ($D_{50}$) ranging from 5 μm to 12 μm, including preparing a precursor solution by adding lithium salt and metal oxide to a volatile solvent and stirring, providing the precursor solution into a chamber of a spray dryer, and spraying the precursor solution in the chamber and drying.

According to an embodiment of the present invention, the secondary particles of the lithium metal oxide particles may be formed by a separate granulation process after the preparation of the primary particles. However, the secondary particles may be typically prepared by a method of preparing primary particles and simultaneously agglomerating the primary particles through a single process. Examples of the above method may include a spray drying method. Hereinafter, the method of preparing an anode active material according to the embodiment of the present invention will be described using the spray drying method as an example.

According to an embodiment of the present invention, the metal oxide may be titanium oxide.

Specifically, the method of preparing the lithium metal oxide particles having an internal porosity ranging from 3% to 8% and an average particle diameter ($D_{50}$) ranging from 5 μm to 12 μm of the present invention may include preparing a precursor solution by adding a lithium salt and titanium oxide to a volatile solvent and stirring.

More particularly, the lithium salt is dissolved in the volatile solvent, and the precursor solution may then be prepared by adding the titanium oxide as the metal oxide thereto while being stirred.

Herein, the volatile solvent is not particularly limited so long as it is easily volatile at a spraying temperature. However, the volatile solvent, for example, may be water, acetone, or alcohol.

Also, the lithium salt may be a lithium source in a spray drying process for preparing lithium metal oxide particles, and may be any one selected from the group consisting of lithium hydroxide, lithium oxide, and lithium carbonate or a mixture of two or more thereof. Furthermore, the titanium oxide may be a titanium source.

The preparation method according to the embodiment of the present invention may include providing the precursor solution into a chamber that is included in a spray dryer.

A typically used spray dryer may be used as the above spray dryer, and for example, an ultrasonic spray dryer, an air nozzle spray dryer, an ultrasonic nozzle spray dryer, a filter expansion aerosol generator, or an electrostatic spray dryer may be used. However, the present invention is not limited thereto.

According to an embodiment of the present invention, a feed rate of the precursor solution into the chamber may be in a range of 10 ml/min to 1,000 ml/min. In the case that the feed rate is less than 10 ml/min, the average particle diameter of the agglomerated lithium metal oxide particles may decrease and thus, the formation of the high-density lithium metal oxide particles may be difficult. In the case in which the feed rate is greater than 1,000 ml/min, since the average particle diameter of the lithium metal oxide particles may relatively increase, realization of desired high rate characteristics may be difficult.

Furthermore, the preparation method according to the embodiment of the present invention may include spraying the precursor solution in the chamber and drying.

The precursor solution may be sprayed through a disc rotating at a high speed in the chamber and the spraying and the drying may be performed in the same chamber.

In addition, the internal porosity of the present invention may be realized by controlling spray drying conditions, for example, flow of carrier gas, retention time in a reactor, and internal pressure.

According to an embodiment of the present invention, the internal porosity of the lithium metal oxide particles may be controlled by the adjustment of drying temperature, and the drying may be performed at a temperature ranging from 20° C. to 300° C. However, the drying may be performed at a temperature as low as possible for the high density of the lithium metal oxide particles.

Also, the average particle diameter of the lithium metal oxide particles may be controlled by changing a concentration of a solid content in the precursor solution.

High-density lithium metal oxide particles may be prepared by performing a heat treatment process on the prepared precursor using a general sintering furnace at a temperature between about 700° C. and about 850° C. for about 5 hours to about 20 hours in an air atmosphere or an oxygen atmosphere.

The present invention may also provide an anode including the anode active material, and a lithium secondary battery including the anode.

An anode current collector is coated with a slurry which is prepared by mixing an anode slurry including the anode active material with a solvent, such as N-methylpyrrolidone (NMP), and the anode may then be prepared by drying and rolling the anode current collector. The anode slurry may selectively include a conductive agent, a binder, or a filler, in addition to the anode active material.

The anode current collector is not particularly limited so long as it does not generate chemical changes in the battery as well as having high conductivity. Examples of the anode current collector may be copper, stainless steel, aluminum, nickel, titanium, sintered carbon, copper or stainless steel surface treated with carbon, nickel, titanium, or silver, aluminum-cadmium alloy, etc. Fine irregularities may also be formed on a surface of the anode current collector to increase the adhesion of the anode active material, and the anode current collector may be used in various forms, such as a film, sheet, foil, net, porous body, foam, or nonwoven fabric.

The conductive agent may be typically added in an amount ranging from 1 wt % to 30 wt % based on a total weight of a mixture including the anode active material. The conductive agent is not particularly limited so long as it does not generate chemical changes in the battery as well as having conductivity. Examples of the conductive agent may be graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder and nickel powder; conductive whiskers such as zinc oxide whiskers and potassium titanate whiskers; conductive metal oxide such as titanium oxide; a conductive material such as a polyphenylene derivative, etc.

The binder is a component that assists in bonding between the active material and the conductive agent and bonding with respect to the current collector, and the binder may be typically added in an amount ranging from 1 wt % to 30 wt % based on the total weight of the mixture including the anode active material. Examples of the binder may be polyvinylidene fluoride (PVdF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc.

The filler is selectively used as a component that prevents the expansion of the anode and is not particularly limited so long as it does not generate chemical changes in the battery as well as being a fibrous material. Examples of the filler may be olefin-based polymers such as polyethylene and polypropylene; and fibrous materials such as glass fibers and carbon fibers.

A method of uniformly coating the anode current collector with the anode slurry may be selected from known methods in consideration of material characteristics or may be performed by a new appropriate method. For example, a paste is distributed on the current collector, and the paste is then uniformly dispersed by using a doctor blade. In some cases, a method of performing the distribution and dispersion processes in a single process may also be used. In addition, a method, such as die casting, comma coating, and screen printing, may be selected, or the anode slurry may be molded on a separate substrate and the molded anode slurry may then be bonded with the current collector by pressing or lamination.

For example, a cathode current collector is coated with a cathode slurry including a cathode active material, and the cathode may then be prepared by drying the cathode current collector. The cathode slurry, if necessary, may include the above-described components.

In particular, as the cathode active material, the lithium secondary battery may use a layered compound, such as lithium cobalt oxide ($LiCoO_2$) or lithium nickel oxide ($LiNiO_2$), or a compound substituted with one or more transition metals; lithium manganese oxides such as $Li_{1+x}Mn_{2+x}O_4$ (where x is 0 to 0.33), $LiMnO_3$, $LiMn_2O_3$, and $LiMnO_2$; lithium copper oxide ($Li_2CuO_2$); vanadium oxides such as $LiV_3O_8$, $LiFe_2O_4$, $V_2O_5$, and $Cu_2V_2O_7$; Ni-site type lithium nickel oxides expressed by a chemical formula of $LiNi_{1-x}M_xO_2$ (where M is cobalt (Co), manganese (Mn), Al, Cu, Fe, magnesium (Mg), boron (B), or gallium (Ga), and x is 0.01 to 0.3); lithium manganese complex oxides expressed by a chemical formula of $LiMn_{2-x}O_2$ (where M is Co, nickel (Ni), Fe, chromium (Cr), Zn, or tantalum (Ta), and x is between 0.01 and 0.1) or $Li_2Mn_3MO_8$ (where M is Fe, Co, Ni, Cu, or Zn); $LiMn_2O_4$ having a part of Li substituted with alkaline earth metal ions; a disulfide compound; or $Fe_2(MoO_4)_3$. However, $LiNi_xMn_{2-x}O_4$ (where x is 0.01 to 0.6) may be used, and for example, $LiNi_{0.5}Mn_{1.5}O_4$ or $LiNi_{0.4}Mn_{1.6}O_4$ may be used. That is, in the present invention, spinel lithium manganese complex oxide of $LiNi_xMn_{2-x}O_4$ (where x is 0.01 to 0.6) having relatively high potential due to the high potential of the anode active material may be used as the cathode active material.

Any battery case typically used in the art may be selected as a battery case used in the present invention. A shape of the lithium secondary battery according to the use thereof is not limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be more fully described according to specific embodiments. The present invention may, however, be embodied in many different forms and should not be construed as being limited to the embodiments set forth herein.

EXAMPLES

Example 1

Preparation of $Li_4Ti_5O_{12}$ Having an Average Particle Diameter of 5.4 μm and an Internal Porosity of 3.5%

$LiOH·H_2O$ and $TiO_2$ (anatase) were mixed at a molar ratio of 4:5. A mixture was dissolved in pure water and a solution was then stirred. In this case, a ratio of a total solid material is defined as a solid content of the solution, and a precursor solution was prepared by adjusting the solid content to 30% and stirring. The precursor solution was provided into a chamber of a spray dryer (by EIN SYSTEMS, Co., Ltd.). Then, the precursor solution was sprayed in the chamber and dried. The spray drying were performed under conditions including a drying temperature of 130° C., an internal pressure of −20 mbar, and a feed rate of 30 ml/min, and a $Li_4Ti_5O_{12}$ anode active material having an average particle diameter of 5.4 μm and an internal porosity of 3.5% was then obtained by sintering the precursor thus obtained at 800° C. in air.

Examples 2 to 4

Preparation of $Li_4Ti_5O_{12}$ $Li_4Ti_5O_{12}$ anode active materials having average particle diameters and internal porosities listed in Table 1 were obtained in the same manner as Example 1 except that spraying conditions listed in the following Table 1 were changed.

Comparative Examples 1 to 5

Preparation of $Li_4Ti_5O_{12}$ $Li_4Ti_5O_{12}$ anode active materials having average particle diameters and internal porosities listed in Table 1 were obtained in the same manner as Example 1 except that the spraying conditions listed in the following Table 1 were changed.

TABLE 1

| Examples | Drying temperature (° C.) | Internal pressure (mbar) | Solution solid content (%) | Feed rate (ml/min) | [1]Average particle diameter (μm) | [2]Internal porosity (%) |
|---|---|---|---|---|---|---|
| Example 1 | 130 | −20 | 30 | 30 | 5.4 | 3.5 |
| Example 2 | 170 | −30 | 30 | 30 | 6 | 4.1 |
| Example 3 | 210 | −40 | 30 | 30 | 6.2 | 7.8 |
| Example 4 | 130 | −20 | 40 | 70 | 12 | 3.6 |
| Comparative Example 1 | 80 | −10 | 30 | 30 | 5.5 | 2.5 |
| Comparative Example 2 | 230 | −50 | 30 | 30 | 6 | 9 |
| Comparative Example 3 | 250 | −70 | 30 | 30 | 6.5 | 15 |
| Comparative Example 4 | 130 | −20 | 10 | 10 | 3 | 3.5 |
| Comparative Example 5 | 130 | −20 | 50 | 100 | 14 | 3.7 |

[1]Average particle diameter: laser diffraction method (Microtac MT 3000)
[2]Internal porosity = volume of pores per unit mass/(specific volume + volume of pores per unit mass) (use BELSORP (BET instrument) by BEL Japan Inc., use values calculated by the Barrett-Joyner-Halenda (BJH) method, i.e., a mesopore measurement method)

Examples 5 to 8

Lithium Secondary Battery Preparation

<Anode Preparation>

$Li_4Ti_5O_{12}$ of Examples 1 to 4 listed in Table 1 as an anode active material, carbon black (Super P) as a conductive agent, and PVdF as a binder were mixed at a weight ratio of 88:4:8, and the mixture was then added to N-methyl-2-pyrrolidone as a solvent to prepare a slurry. One surface of a copper current collector was coated with the prepared slurry to a thickness of 65 μm, and then dried and rolled. Then, anodes were prepared by punching into a predetermined size.

<Lithium Secondary Battery Preparation>

Ethylene carbonate (EC) and diethyl carbonate (DEC) were mixed at a volume ratio of 30:70 to prepare a non-aqueous electrolyte solvent, and $LiPF_6$ was added thereto to prepare a 1 M $LiPF_6$ non-aqueous electrolyte solution.

Also, a lithium foil was used as a counter electrode, i.e., a cathode, and a polyolefin separator was disposed between both electrodes. Then, coin-type half cells were prepared by injecting the electrolyte solution.

Comparative Examples 6 to 10

Lithium Secondary Battery Preparation

Lithium secondary batteries were prepared in the same manner as Example 5 except that $Li_4Ti_5O_{12}$ of Comparative Examples 1 to 5 listed in Table 1 were used as an anode active material.

Experimental Example 1

SEM Micrograph

Figure 2:
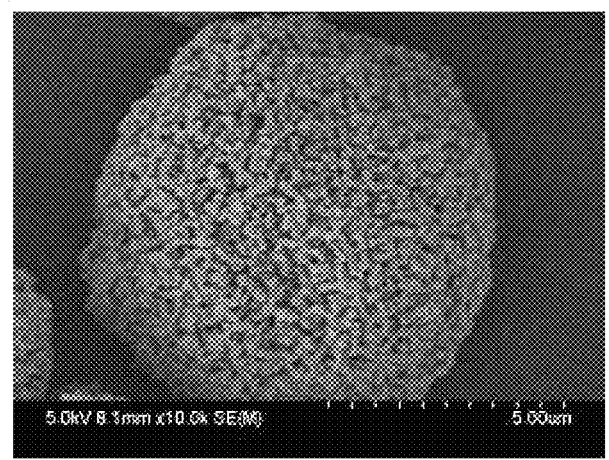
FIG. 2 is a SEM micrograph of high-density $Li_4Ti_5O_{12}$ of Example 1 according to an embodiment of the present invention.

Lithium metal oxide anode active materials prepared in Comparative Example 3 and Example 1 were respectively identified by scanning electron microscope (SEM) micrographs, and the results thereof are respectively presented in FIGS. 1 and 2.

FIG. 1 is a SEM micrograph of $Li_4Ti_5O_{12}$ having an average particle diameter of 6.5 μm and an internal porosity of 15%, wherein it may be confirmed that the $Li_4Ti_5O_{12}$ was composed of porous secondary particles in which pores were formed on the surface and inside of the secondary particle due to the agglomeration of primary particles. In this case, black regions in the particle represent pores.

With respect to FIG. 2, primary particles were agglomerated to constitute a secondary particle, and a SEM micrograph of $Li_4Ti_5O_{12}$ having an average particle diameter of 5.4 μm and an internal porosity of 3.5% is illustrated. It may be visually confirmed that the $Li_4Ti_5O_{12}$ of Example 1 had higher density than the $Li_4Ti_5O_{12}$ of Comparative Example 3.

Experimental Example 2

Adhesion Measurement

Adhesion to an anode was measured using the anodes prepared during the preparation of the lithium secondary batteries of Examples 5 to 8 and Comparative Examples 6 to 10. The adhesion measurement was performed using a generally known 180-degree peel test. The results thereof are presented in Table 2 below.

<High Rate Characteristics Analysis>

In order to analyze high rate characteristics of the lithium secondary batteries of Examples 5 to 8 and Comparative Examples 6 to 10, the high rate characteristics of the lithium secondary batteries were evaluated by sequentially changing charge and discharge rates to 0.1 C, 0.2 C, 0.5 C, 1 C, 0.2 C, 2 C, 0.2 C, 5 C, 0.2 C, and 10 C, respectively. In this case, a charge end voltage was set as 1.0 V and a discharge end voltage was set as 2.5 V. The high rate characteristics for each lithium secondary battery were expressed as a percentage value of a capacity measured at 10 C with respect to a capacity at 0.1 C.

The results thereof are presented in Table 2 below.

TABLE 2

|  | Electrode composition (active material/conductive agent/binder) | Adhesion (gf) | 10 C/0.1 C (%) |
|---|---|---|---|
| Example 5 | 88/4/8 | 15 | 78 |
| Example 6 | 88/4/8 | 12 | 74 |
| Example 7 | 88/4/8 | 7 | 70 |
| Example 8 | 88/4/8 | 20 | 72 |
| Comparative Example 6 | 88/4/8 | 20 | 67 |

TABLE 2-continued

| | Electrode composition (active material/conductive agent/binder) | Adhesion (gf) | 10 C/0.1 C (%) |
|---|---|---|---|
| Comparative Example 7 | 88/4/8 | 4 | 66 |
| Comparative Example 8 | 88/4/8 | 2 | 60 |
| Comparative Example 9 | 88/4/8 | 6 | 63 |
| Comparative Example 10 | 88/4/8 | 25 | 64 |

As illustrated in Table 2, in the case that $Li_4Ti_5O_{12}$ particles had similar average particle diameters, it may be confirmed that there were differences in the adhesion to the electrode due to the differences in the internal porosity of the lithium metal oxide particles and furthermore, the high rate characteristics were affected. The reason for this may be understood in the following way: in the case in which the internal porosity of the lithium metal oxide particles increased, the binder may be introduced into pores in the lithium metal oxide particles to loosen the connection between the anode active material and the conductive agent, and thus, electrode resistance may increase. As a result, the high rate characteristics may degrade.

Also, in the case that the internal porosity of the lithium metal oxide particles was relatively low, since the penetration of the electrolyte solution into the active material was not facilitated, it may cause the degradation of the high rate characteristics despite high adhesion.

In addition, with respect to the lithium metal oxide particles having similar internal porosities, it may be confirmed that electrode adhesion and high rate characteristics were different due to the differences in particle diameters thereof. It may be interpreted as the result of the reduction of the electrode adhesion when the particle diameter was relatively small.

In the case that the diameter of the lithium metal oxide particle was large, it may be understood that the high rate characteristics may decrease due to the decrease in the electrical conductivity of the active material in the lithium metal oxide particles.

Therefore, it may be confirmed that the balance between the internal porosity of the lithium metal oxide particles and the average particle diameter of the lithium metal oxide particles was required to improve the high rate characteristics.

INDUSTRIAL APPLICABILITY

As described above, an anode active material according to the technical idea of the present invention includes high-density lithium metal oxide particles, and thus, the adhesion to an anode may be significantly improved. That is, an amount of a binder required to obtain the same strength of adhesion to the electrode may be significantly reduced in comparison to a typical anode active material having a typical density.

High-density lithium metal oxide particle may be formed as the internal porosity of the lithium metal oxide particles decreases. As a result, the amount of the binder required to prepare an anode slurry may be reduced, and thus, it is advantageous for the mass production of secondary batteries.

Since the realization of the high-density lithium metal oxide and the resultant good adhesion to the electrode may be possible, an average particle diameter of the lithium metal oxide particles may be further decreased. As a result, high rate characteristics of the secondary battery may be improved.

The invention claimed is:

1. An anode active material comprising lithium metal oxide particles,
    wherein an internal porosity of the lithium metal oxide particles is in a range of 3% to 8% and an average particle diameter ($D_{50}$) thereof is in a range of 5 μm to 12 μm, and wherein the lithium metal oxide is any one selected from the group consisting of $Li_4Ti_5O_{12}$, $LiTi_2O_4$, $Li_2TiO_3$, $Li_2Ti_3O_7$, and a mixture of two or more thereof.

2. The anode active material of claim 1, wherein the lithium metal oxide particle is a secondary particle, in which two or more primary particles are agglomerated.

3. The anode active material of claim 2, wherein an average particle diameter of the primary particles is in a range of 100 nm to 400 nm.

4. The anode active material of claim 1, wherein a specific surface area (Brunauer-Emmett-Teller (BET)) of the lithium metal oxide particles is in a range of 2 $m^2$/g to 8 $m^2$/g.

5. An anode comprising the anode active material of claim 1.

6. A secondary battery comprising the anode of claim 5.

7. The anode active material of claim 1, wherein the internal porosity of the lithium metal oxide particles is in a range of 3.5% to 8%.

* * * * *